US005606457A

United States Patent [19]

Chiu et al.

[11] Patent Number: 5,606,457
[45] Date of Patent: Feb. 25, 1997

[54] HIGH-SPEED OPTICAL IMAGE CORRELATOR

[75] Inventors: Tien-Heng Chiu, Spotswood; Alastair M. Glass, Rumson; Afshin Partovi, Edison, all of N.J.

[73] Assignee: Lucent Technologies Inc., Murray Hill, N.J.

[21] Appl. No.: 385,995

[22] Filed: Feb. 6, 1995

Related U.S. Application Data

[63] Continuation of Ser. No. 37,858, Mar. 29, 1993.

[51] Int. Cl.[6] .......... G02B 27/46

[52] U.S. Cl. .......... 359/561; 359/558

[58] Field of Search .......... 359/7, 561, 558

[56] References Cited

U.S. PATENT DOCUMENTS

| | | | |
|---|---|---|---|
| 5,004,325 | 4/1991 | Glass et al. . | |
| 5,115,335 | 5/1992 | Soref | 359/248 |
| 5,150,228 | 9/1992 | Liu et al. | 359/7 |
| 5,311,009 | 5/1994 | Capasso | 250/214 LS |
| 5,394,260 | 2/1995 | Suzuki et al. | 359/158 |

OTHER PUBLICATIONS

H. Rajbenbach et al., "Compact photorefractive correlator for robotic applications," App. Opt. 31, 5666–5674 Sep. 1992.

D. T. H. Liu et al., "Real–Time Vanderlugt optical correlator that uses photorefractive GaAs," Appl. Optics 31, 5675–5680 Sep. 1992.

A. Partovi et al., "High sensitivity optical image processing device based on CdZnTe/ZnTe multiple quantum well structures," Appl. Phys. Lett. 59, 1832–1834 Oct. 1991.

A. Partovi et al., "High-speed photodiffractive effect in semi–insulating CdZnTe/ZnTe multiple quantum wells," Opt. Lett. 17, 655–657 May 1992.

*Primary Examiner*—Georgia Y. Epps
*Assistant Examiner*—Ricky Mack
*Attorney, Agent, or Firm*—Martin I. Finston

[57] ABSTRACT

An optical image correlator includes a photorefractive medium for recording an interference pattern that corresponds to the Fourier transform of an input image or the multiplicative product of the Fourier transforms of two respective input images. In contrast to correlators of the prior art, the correlator described here includes a semi-insulating, multiple quantum well device as the photorefractive medium.

9 Claims, 4 Drawing Sheets

HIGH-SPEED OPTICAL IMAGE CORRELATOR

This application is a continuation division of application Ser. No. 08/037,858, filed on Mar. 3, 1993.

FIELD OF THE INVENTION

The invention relates to optical image correlators of the kind in which image information is stored in a photorefractive medium.

ART BACKGROUND

It has long been recognized that optical image correlators may have useful applications for pattern recognition. One class of correlators are known as "joint Fourier transform optical correlators." In these devices, conveniently described with reference to FIG. 1, Fourier-transform lens 80 operates on a pair of coherent images representing a reference R and an unknown object S. The resulting optical intensity distribution in the focal plane of the Fourier-transform lens is recorded in photorefractive medium 25. The output of the correlator is generated by a Fourier-transform lens (also shown in the figure as lens 80) operating on the recorded pattern. Each of two side regions of the output image (symmetrically displaced from the center by the separation between R and S) contains an intensity distribution corresponding to the cross correlation between R and S. The position of a correlation peak identifies the location of a feature of R that resembles S. The height of the peak measures the degree of similarity. A correlator of this kind is described, e.g., in H. Rajbenbach et at., "Compact photorefractive correlator for robotic applications," *App. Opt.* 31 (1992) 5666–5674. This system used a crystal of $Bi_{12}SiO_{20}$ (BSO) as the photorefractive medium. With this material, a typical response time of about 50 ms was achieved. Using a crystal about 1 mm thick, diffraction efficiencies of 0.1% –1% were obtained.

A second class of correlators are known as "Vanderlugt optical correlators" . These devices are described, e.g., in D.T.H. Liu et al., "Real-time Vanderlugt optical correlator that uses photorefractive GaAs," *Appl. Optics* 31 (1992) 5675–5680. In these correlators, conveniently described with reference to FIG. 2, the Fourier transform of, e.g., the S image is written in photorefractive medium 25 by interfering it with reference beam 5, which is typically a plane wave. The output of the correlator is generated by using lens 84 to create a Fourier transform of the R image, which is impinged on the photorefractive medium. As depicted in the figure, lens 82 is used both to generate the Fourier transform of the S image, and to generate the inverse Fourier transform of the output from the photorefractive medium.

The system described by D.T.H. Liu et al. used a crystal of gallium arsenide, 5 mm thick, as the photorefractive medium. Diffraction efficiencies less than 0.1% were obtained. The shortest response time measured was 0.8 ms at a laser intensity of about 1.5 $W/cm^2$.

There remains a need for photorefractive media that are more sensitive and that respond more quickly to low-power beams. That is, optical processing has hitherto been limited to video rates or the like. Substantially greater processing rates are desirable for, e.g., applications in which great volumes of image data need to be processed. Moreover, the density of resolvable spots in the input images R and S is limited by the thickness of the photorefractive medium. Greater sensitivity is required in order to achieve diffraction efficiencies of 1% or more in thicknesses substantially less than 1 mm.

SUMMARY OF THE INVENTION

A class of photorefractive devices has recently been reported, that use the nonlinear optical properties of semi-insulating, multiple quantum well (SI-MQW) structures. Diffraction efficiencies as great as 3% have been achieved in SI-MQW structures only 2 μm thick. We have found that by incorporating such a device as the photorefractive medium in an optical image correlator, we can perform correlation operations in as little as 1 μs or less.

Accordingly, the invention, in a broad sense, is an optical image correlator of the kind that includes an input source and an output source of coherent light. (The term "light" is meant to include invisible portions of the electromagnetic spectrum, such as infrared radiation.) The correlator further includes means for impressing on the input light spatial intensity modulation patterns corresponding to at least one input image, a lens for creating a Fourier transform of the modulation pattern, and a photorefractive medium for recording the Fourier transform as an absorption-modulation and/or refractive modulation pattern, and for modulating the output light in accordance with the recorded pattern. In contrast to correlators of the prior art, the photorefractive medium of the inventive correlator includes a SI-MQW structure.

DETAILED DESCRIPTION OF A PREFERRED EMBODIMENT

Figure 1:
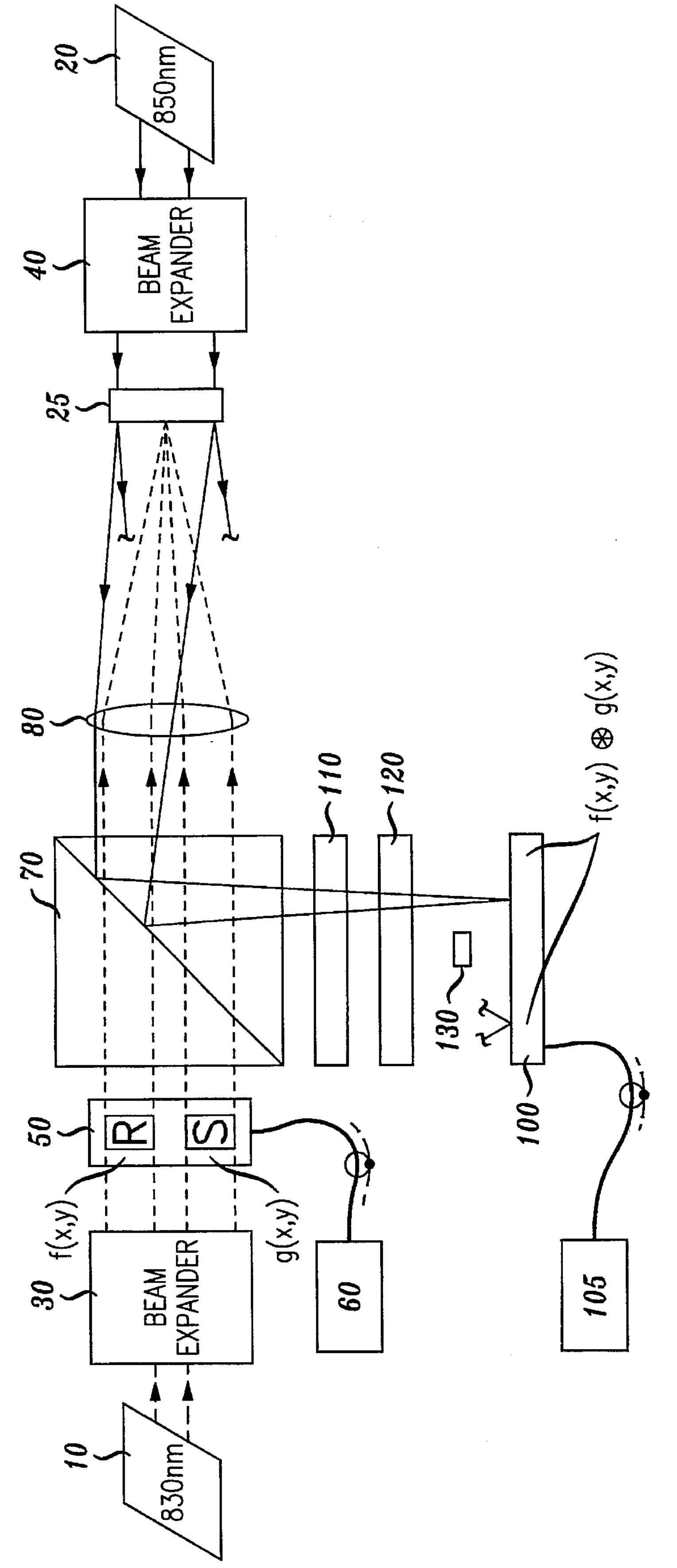
FIG. 1 (PRIOR ART)
FIG. 1 is a schematic, block diagram of a joint Fourier transform optical image correlator.
Figure 2:
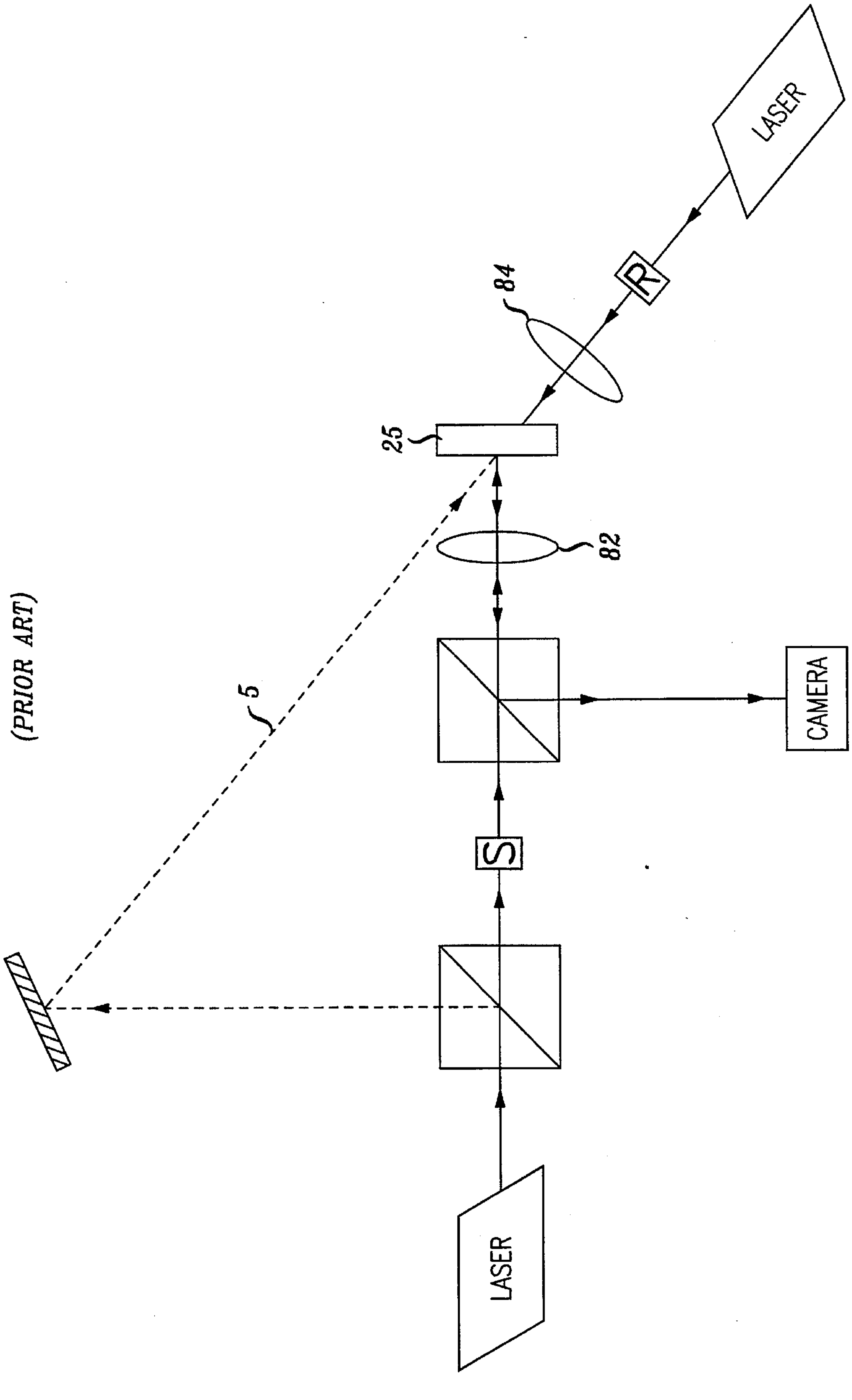
FIG. 2 (PRIOR ART)
FIG. 2 is a schematic, block diagram of a Vanderlugt optical image correlator.

The inventive correlator can be made as either a joint Fourier transform correlator or a Vanderlugt correlator. In either case, the general features of the correlator are well known. A joint Fourier transform correlator is described, e.g., in H. Rajbenbach et al., cited above. A Vanderlugt correlator is described, e.g., in D.T.H. Liu et al., cited above. By way of illustration, we now briefly describe, with reference to FIG. 1, a joint Fourier transform correlator that we have used successfully in experimental trials. Modifications of this system to achieve, instead, a Vanderlugt correlator will be readily apparent to the skilled practitioner.

A beam of input light is provided by laser 10, which is exemplarily a vertically polarized, 150 mW, single longitudinal mode diode laser emitting at 830 am. A beam of output light is provided by laser 20, which is exemplarily a vertically polarized, single longitudinal mode diode laser emitting at 850 nm. Laser 20 is typically operated at a power level of about 10 mW. Its emission wavelength can be temperature-tuned to maximize the diffraction efficiency from photorefractive medium 25. The beam from each of lasers 10 and 20 is passed through an optical subsystem 30, 40 consisting of a lens, an anamorphic prism pair, and a beam expander. These subsystems expand and collimate the laser beams.

Modulator 50 is exemplarily a liquid-crystal, spatial light modulator. We have used a modulator sold by the Epson corporation as the Epson Crystal Image Video Projector. This modulator has an aperture of 2.0 cm×2.6 cm, and a pixel resolution of 320 ×220. This modulator, as purchased, includes polarizer films that are removed before the modulator is incorporated in the correlator. The modulator is driven with a video signal from video source 60 to produce a pair of side-by-side images R and S. (At this stage, the images are not visible because they exist only as a polarization rotation.) Polarizing beam-splitter cube 70 converts the pattern of polarization rotation to a pattern of intensity modulation.

Lens 80, exemplarily a doublet lens with a focal length of 26 cm, operates on the input beam to produce a Fourier transform of the input images. More precisely stated, photorefractive medium 25, situated at the Fourier plane of lens 80, records the interference pattern corresponding to the multiplicative product of the Fourier transforms of the respective input images. The average grating period at the photorefractive medium is about 10 μm. (The average grating period is the period of the interference pattern between the respective beams emanating from the centers of the R and S images. This period is determined by the separation between the images and the focal length of lens 80. If this period is too small, the diffraction efficiency of the system is reduced.)

The output beam reads the recorded pattern by passing through the photorefractive medium. The output beam then passes through lens 80, with the result that the inverse Fourier transform of the recorded pattern is carded by the output beam. The output beam then falls on CCD camera 100 situated at the back focal plane of lens 80. The output of camera 100 is recorded by frame grabber 105. To remove spurious light at 830 nm (i.e., the wavelength of the input beam), a bandpass interference filter 110 centered at 850 nm (i.e., the wavelength of the output beam) is placed between lens 80 and camera 100. To reduce the optical intensity impinging on camera 100, a neutral density filter 120 (typically with a density of 1 ) is also placed between the lens and the camera. A beam block 130 situated between the lens and the camera excludes that component of the output beam having zero spatial frequency.

Figure 5:
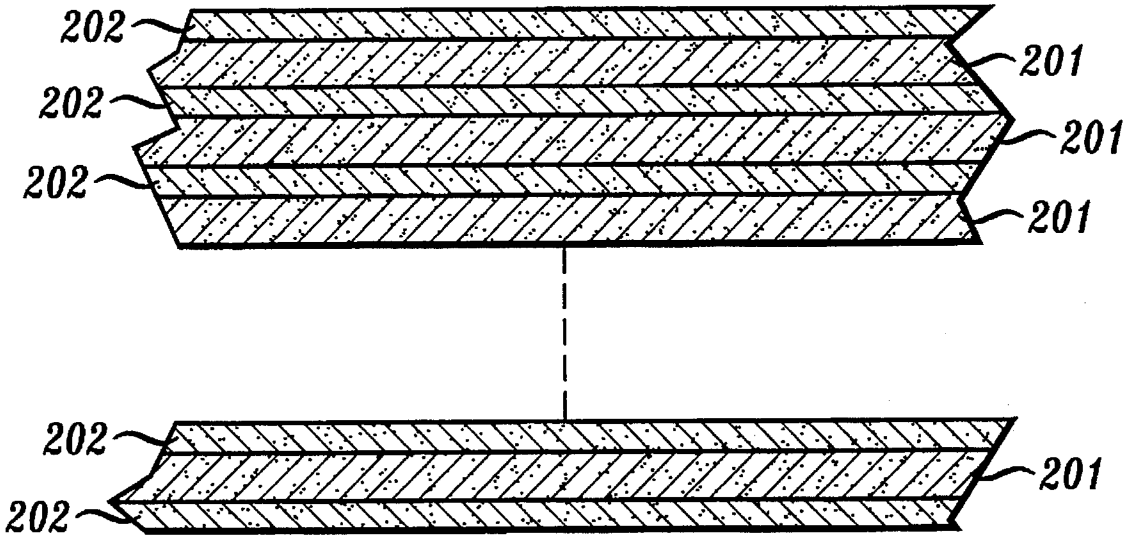
FIG. 5 depicts a multiple quantum well structure.

In contrast to correlators of the prior art, photorefractive medium 25 of the inventive correlator is a SI-MQW device. Devices of this kind are described generally in U.S. Pat. No. 5,004,325, issued to A. M. Glass et al. on Apr. 2, 1991. By way of illustration, we now briefly describe a SI-MQW device that we have used successfully in experimental trials. This device shown in FIG. 5 comprises 155 periods of 10 nm GaAs quantum wells 201 and 3.5 nm $Al_{0.29}$ $Ga_{0.71}$ As barriers 202 grown by molecular beam epitaxy (MBE). This periodic structure is included between a pair of evaporated, 200 nm dielectric layers 203 of phosphate silica glass, each overcoated with a transparent electrode layer of cadmium tin oxide. The entire periodic structure is made semi-insulating by doping it with $10^{16}$ $cm^{-3}$ of chromium. The lower 150 periods are grown at 630° C. To reduce carder diffusion in the device, the upper 5 periods are grown at 380° C., resulting in a carrier lifetime less than 1 ps in that portion of the device.

It should be noted in this regard that the SI-MQW device is not necessarily based on a III–V material system. For example, SI-MQW devices based on II–VI material systems are described in A. Partovi et at., "High sensitivity optical image processing device based on CdZnTe/ZnTe multiple quantum well structures," *Appl. Phys. Lett.* 59 (1991) 1832–1834, and in A. Partovi et al., "High-speed photodiffractive effect in semi-insulating CdZnTe/ZnTe multiple quantum wells," *Opt. Lett.* 17 (1992) 655–657. These devices are typically made semi-insulating by ion-implanting them with protons.

In use, a potential of 5–20 V is typically applied across the SI-MQW device. This results in large changes in the optical absorption and refractive index near the exciton absorption peak at 850 nm. This behavior is attributed to the quantum confined Stark effect. When the device is illuminated with photon energies greater than the bandgap, photogenerated carriers drift to the semiconductor-dielectric interface and screen the periodic structure from the applied electric field. This can lead to spatial modulation of the optical absorption and refractive index. Both the input and output lasers are typically operated continuously.

We have found that the SI-MQW device is able to store the recorded pattern for a controllable period of time. This storage ability is a consequence of trapping of the photogenerated carriers after they have migrated to the semiconductor-dielectric interfaces. In studies of this storage ability, we pulsed the input laser, typically for 2 μs at a power of 150 mW, resulting in about 3 mW of optical power at the SI-MQW device. We found that a 35-μs voltage pulse produced an autocorrelation peak having a rise time of 1 μs and persisting for up to about 25 μs after the end of the input laser pulse. When the length of the voltage pulse was reduced to 2 μs, the autocorrelation peak still had a rise time of 1 μs, but it persisted for only about 2 μs. We found that by continuously varying the length of the voltage pulse, we can produce any storage time between 2 μs and 25 μs. (We believe that the storage time can be further increased by modifying the design of the SI-MQW device.) This ability to control the storage time will be useful, e.g., in applications of the correlator as a data or image buffer.

The relatively low frame rate of the modulator that we used, and the relatively low electrical data throughput of the CCD camera that we used, limited the throughput of the correlator to about 30 frames per second. This rate can be improved by using faster components. For example, ferroelectric LCSLMs are available that can operate at thousands of frames per second.

We believe that still higher frame rates can be achieved by using a spatial light modulator based on a SI-MQW device. Such a modulator is described in the co-pending U.S. patent application filed by T-H Chiu et al. and entitled "Spatial Light Modulator Using Quantum Well Material." Because the photorefractive medium of that modulator is semi-insulating rather than conductive, individual picture elements are defined by the attachments to an array of small electrodes, without the need for etching to establish electrical isolation.

EXAMPLE

Figure 3:
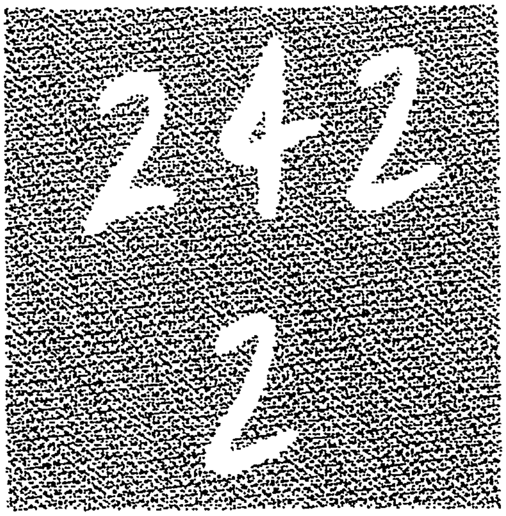
FIG. 3 depicts an illustrative pair of handwritten images that were input to the correlator of FIG. 1.
Figure 4:
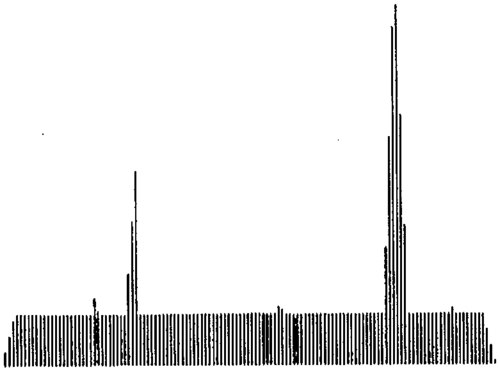
FIG. 4 depicts a surface plot of a portion of the output of the CCD camera in response to the input images of FIG. 3.

FIG. 3 depicts a pair of handwritten images that were input to the correlator described above. The upper image is the R image, consisting of the handwritten numeral "242". The lower image is the S image, consisting of a handwritten numeral "2". It is apparent that the leftmost "2" of the R image is formed somewhat differently from the "2" of the S image. FIG. 4 depicts a surface plot of a portion of the output of the CCD camera in response to these input images. It is apparent that the cross-correlation peak of the leftmost "2" has only about half the amplitude of the cross-correlation peak of the rightmost "2", which more strongly resembles the "2" of the S image. No cross-correlation peak appears for the "4" of the R image.

The surface plot exhibits relatively little scatter noise. This is at least partly attributable to the extreme flatness, approaching atomic flatness, of the SI-MQW structure.

We found that the correlator was somewhat tolerant to variations of image shape. We correlated a pair of images, each consisting of the typed characters "SI-MQW". We increasingly varied the size and shape of one of these images until the correlation peak fell to the average noise level. In this exercise, we found an angular tolerance of ±20° and a size tolerance of ±20% .

We claim:

1. An optical image correlator, comprising:

a) a source of a coherent input beam of light;

b) a source of a coherent output beam of light;

c) means for impressing on the input beam a spatial, intensity-modulation pattern corresponding to at least a first input image;

d) a lens for creating a Fourier transform of the modulation pattern; and e) a photorefractive medium for recording the Fourier transform as an intensity modulation pattern, and for modulating the output beam according to the recorded pattern,

CHARACTERIZED IN THAT f) the photorefractive medium comprises a semi-insulating, multiple quantum well structure that includes, in alternation, plural quantum well layers, and plural barrier layers of a higher bandgap than the quantum well layers;

g) the quantum well structure is enclosed between two dielectric layers;

h) the quantum well structure comprises: a first epitaxially grown portion adjacent one of the dielectric layers, and a second epitaxially grown portion adjacent the first portion and distal said dielectric layer;

i) associated with the first portion is a first carrier lifetime and associated with the second portion is a second carrier lifetime; and j) the first portion is grown at a lower temperature than the second portion, such that the first carrier lifetime is smaller than the second carrier lifetime, and the first carrier lifetime is less than one picosecond.

2. Apparatus of claim 1, wherein the semi-insulating, multiple quantum well structure comprises III–V material doped with chromium.

3. Apparatus of claim 2, wherein the III–V material comprises GaAs and $Al_x Ga_{1-x}As$, x a number between 0 and 1.

4. Apparatus of claim 3, wherein x is approximately 0.29.

5. Apparatus of claim 1, wherein the semi-insulating, multiple quantum well structure comprises II–VI material that has been ion-implanted with protons.

6. An optical image correlator, comprising:

a) a source of a coherent input beam of light;

b) a source of a coherent output beam of light;

c) means for impressing on the input beam a spatial, intensity-modulation pattern corresponding to at least a first input image;

d) a lens for creating a Fourier transform of the modulation pattern; and e) a photorefractive medium for recording the Fourier transform as an intensity modulation pattern, and for modulating the output beam according to the recorded pattern,

CHARACTERIZED IN THAT f) the photorefractive medium comprises a semi-insulating, multiple quantum well structure;

g) the correlator further comprises means for applying a voltage pulse, having a variable duration, across the multiple quantum well structure; and h) the correlator further comprises means for varying the duration of the voltage pulse, such that the length of time that the recorded intensity modulation pattern endures is varied.

7. Apparatus of claims 1 or 6 wherein the means for impressing an intensity-modulation pattern comprise a semi-insulating, multiple quantum well device additional to the multiple quantum well structure of claim 1.

8. Apparatus of claims 1 or 6 wherein the impressing means comprise means for impressing on the input beam two spatial, intensity-modulation patterns corresponding, respectively, to the first input image and to a second input image.

9. Apparatus of claims 1 or 6 further comprising means for impressing on the output beam a spatial, intensity-modulation pattern corresponding to a second input image.

* * * * *